(12) United States Patent
Jun

(10) Patent No.: US 6,275,402 B1
(45) Date of Patent: Aug. 14, 2001

(54) PRECISION FULLWAVE RECTIFIER

(75) Inventor: Si-Bum Jun, Chungcheongbuk-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/634,297

(22) Filed: Aug. 9, 2000

(30) Foreign Application Priority Data

Sep. 3, 1999 (KR) .................................................. 99-37319

(51) Int. Cl.[7] .............................. H02M 7/217; G05F 3/20
(52) U.S. Cl. ......................... 363/127; 323/315; 330/261
(58) Field of Search ........................... 363/127, 73, 125, 363/126; 323/315, 316, 317; 327/561, 562, 91; 330/263, 297, 276, 257, 261

(56) References Cited

U.S. PATENT DOCUMENTS

| | | | |
|---|---|---|---|
| 3,667,028 | * | 5/1972 | Leufgen ................................. 363/127 |
| 3,825,852 | * | 7/1974 | Pinckeaers ............................ 330/257 |
| 4,054,843 | * | 10/1977 | Hamada ................................. 330/263 |
| 4,675,594 | * | 6/1987 | Reinke ................................... 323/317 |
| 4,717,869 | * | 1/1988 | Koch et al. ........................... 323/316 |
| 4,835,487 | * | 5/1989 | Doyyle et al. ....................... 330/277 |
| 4,941,080 | * | 7/1990 | Sieborger ............................. 363/127 |
| 4,994,730 | * | 2/1991 | Rossi et al. .......................... 323/315 |
| 5,012,133 | * | 4/1991 | Hughes ................................. 327/91 |

* cited by examiner

*Primary Examiner*—Rajnikant B. Patel

(57) ABSTRACT

The present invention relates to a precision fullwave rectifier which is used in communication systems or non-linear signal processors. The present invention used in communication systems and non-linear signal processors includes an input part receiving a first alternating current input signal and a second alternating current input between which a phase difference of about 180° exists wherein the input part generates a first current and a fourth current proportional to the first alternating current input signal and also generates a second current and a third current proportional to the second alternating current input signal, a first current subtractor outputting a fifth current by subtracting the second current from the first current, a second current subtractor outputting a sixth current by subtracting the fourth current from the third current, and an output part transforming and generate an wave-rectified output voltage by adding the fifth current to the sixth current. Besides, the input part further includes four NMOS transistors, each of the two current subtractors has four NMOS transistors, and the output part consists of a resistor.

9 Claims, 4 Drawing Sheets

PRECISION FULLWAVE RECTIFIER

BACKGROUND OF THE INVENTION

1. Field of Invention

The present invention relates to a precision fullwave rectifier which is used in communication systems or non-linear signal processors.

2. Discussion of Related Art

FIG. 1 shows a circuit for a precision fullwave rectifier using operational amplifiers according to a related art.

Referring to FIG. 1, a precision fullwave rectifeir 10 of a related art amplifies an alternating current input voltage Vin by operational amplifiers and rectifies the current by diodes.

More specifically, a negative input terminal of a first operational amplifier AMP1 receives an input voltage through a first resistor R1 while a positive input terminal is connected to the ground through a sixth resistor R6.

A first diode D1 is connected backward between an output stage and the negative input terminal of the first operational amplifier AMP1, while a second diode D2 is connected forward between the output stage and the negative input terminal.

An output of the first operational amplifier AMP1 is connected to a negative input terminal of a second operational amplifier AMP2 from a node between a second resistor R2 and the first diode D1 through a third resistor R3, and a wave-rectified output is outputted from an output terminal of the second operational amplifier AMP2. An alternating current input voltage Vin is connected to a negative input terminal of the second operational amplifier AMP2 through a fourth resistor R4, while a positive input terminal of the second operational amplifier AMP2 is connected to the ground through a seventh resistor R7. Besides, a fifth resistor R5 is connected between the output stage and the negative input terminal of the second operational amplifier AMP2.

The first, third, and fourth resistors R1, R3, and R4 are equal to one another in resistance, while the resistance of the second resistor R2 is twice larger than that of the first, third or fourth resistor R1, R2 or R4.

The precision fullwave rectifier of the related art is operated as following.

When the alternating current input voltage Vin is a positive pulse(i.e., the voltage has a positive value), the first diode D1 is turned 'on' while the second diode D2 is turned 'off'.

$$\text{Vamp1}=-\text{Vin}\cdot(R2/R1) \quad \text{(formula 1-1)}$$

In the above formula 1-1, an output of the first operational amplifier AMP1 is an inverted negative pulse(i.e, a negative value) having a predetermined gain(Av=R2/R1)

$$\text{Vamp1}+\text{Vin}=-\text{Vin}\cdot(R2/R1-1) \quad \text{(formula 1-2)}$$

The output of the first operational amplifier AMP1 as well as the positive pulse of the initial alternating current input voltage Vin is inputted to the negative input terminal of the second operational amplifier AMP2.

Namely, an output Vout of the second operational amplifier AMP2 is inverted to be outputted as a positive pulse, which is shown in the following formula.

$$\begin{aligned}\text{Vout} &= -(\text{Vamp1}+\text{Vin})\cdot(R5/R3) \\ &= -[-\text{Vin}\cdot(R2/R1-1)]\cdot(R5/R3) \\ &= +[\text{Vin}\cdot(2-1)]\cdot(R5/R3) \\ &= \text{Vin}\cdot(R5/R3)\end{aligned} \quad \text{(formula 1-3)}$$

When the alternating current input voltage Vin is a negative pulse(i.e., a negative value), the first diode D1 is turned 'off' while the second diode D2 is turned 'on'.

$$\text{Vamp1}=-\text{Vin}\cdot(0/R1) \quad \text{(formula 1-4)}$$

Accordingly, an output of the first operational amplifier AMP1, as shown in formula 2-1, is connected virtually to the negative input terminal, becoming 0.

Moreover, a negative pulse of the alternating current input voltage Vin is inputted to the negative input terminal of the second operational amplifier AMP2.

In this case, the output Vout of the second operational amplifier AMP2 is as following.

$$\text{Vout}=-\text{Vin}\cdot(R5/R4) \quad \text{(formula 1-5)}$$

Namely, the negative pulse is inverted to be outputted as a positive pulse, thereby operating wave rectification of the alternating current input voltage.

Unfortunately, the precision fullwave rectifier using operational amplifiers of the related art requires a plurality of resistors consisting of a plurality of pairs, two operational amplifiers, and two diodes, which is unable or impossible to be embodied on an integrated circuit. Moreover, the rectifier of the related art consumes too much power, occupies a large layout area, and has an operational speed limited by the operational amplifiers.

SUMMARY OF THE INVENTION

Accordingly, the present invention is directed to a precision fullwave rectifier that substantially obviates one or more of the problems due to limitations and disadvantages of the related art.

The object of the present invention is to provide a precision fullwave rectifier which has a simple constitution of its circuit, is easily embodied on an integrated circuit, has no speed limitation owing to no-feedback structure, occupies a small layout area because of less devices, and needs less power consumption.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention used in communication systems and non-linear signal processors includes an input part receiving a first alternating current input signal and a second alternating current input between which a phase difference of about 180° exists wherein the input part generates a first current and a fourth current proportional to the first alternating current input signal and also generates a second current and a third current proportional to the second alternating current input signal, a first current subtractor outputting a fifth current by subtracting the second current from the first current, a second current subtractor outputting a sixth current by subtracting the fourth current from the third current, and an output part transforming and generate an wave-rectified output voltage by adding the fifth current to the sixth current. Besides, the input part further includes four NMOS transistors, each of the two current subtractors has four NMOS transistors, and the output part consists of a resistor.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the inventing and together with the description serve to explain the principle of the invention.

DETAILED DESCRIPTION OF PREFERRED EMBODIMENTS

Reference will now be made in detail to the preferred embodiments of the present invention, examples of which are illustrated in the accompanying drawings.

Figure 1:
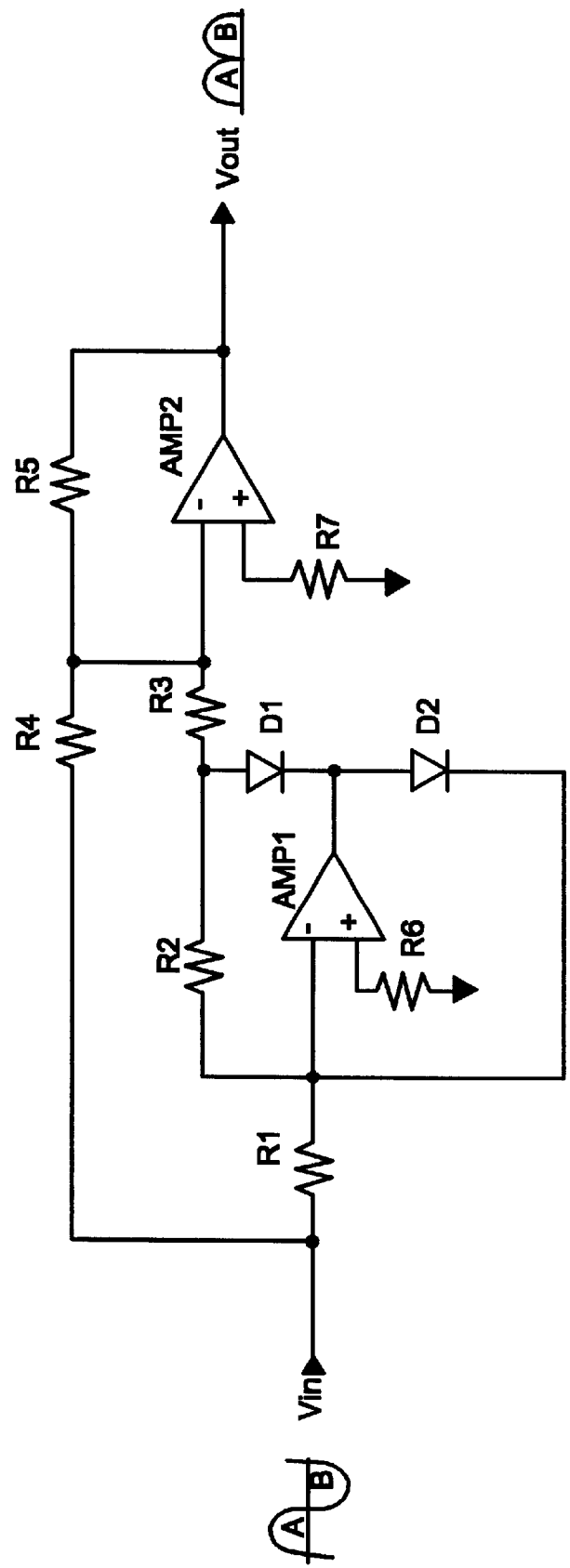
FIG. 1 shows a circuit for a precision fullwave rectifier using operational amplifiers according to a related art.
Figure 2:
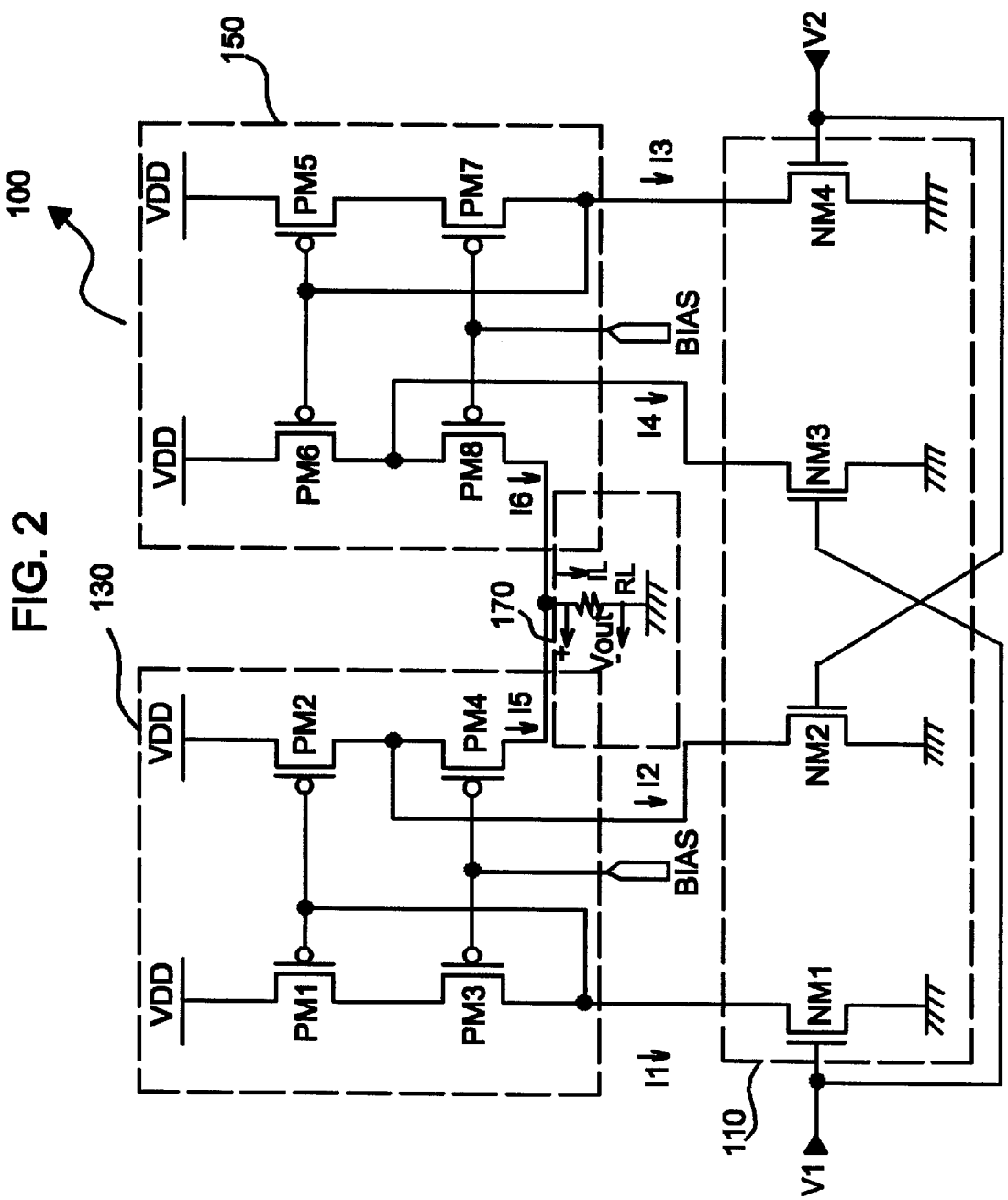
FIG. 2 shows a circuit for a precision fullwave rectifier using MOSFETs according to the present invention.

FIG. 2 shows a circuit for a precision fullwave rectifier using MOSFETs according to the present invention.

Referring to FIG. 2, a precision fullwave rectifier 100 includes an input part 110, a first current subtractor 130, a second subtractor 150, and an output part 170.

The input part 110 receives a first alternating current input signal V1 and a second alternating current input signal V2 between which a phase difference of about 180° exists, thereby generating a first current I1 and a fourth current I4 proportional to the first alternating current input signal V1 and a second current I2 and a third current I3 proportional to the second alternating current input signal V2.

The first current subtractor 130 generates a fifth current I5 by subtracting the second current I2 from the first current I1, while the second current subtractor 150 outputs a sixth current I6 by subtracting the fourth current I4 from the third current I3.

And, the output part 170 generates a wave-rectified output voltage Vout by transforming and adding the fifth current I5 of the first current subtractor 130 to the sixth current I6 of the second current subtractor 150.

The input part 110 consists of a first NMOS transistor NM1 and a third NMOS transistor NM3 which generate the first current I1 and the fourth current I4 respectively through the drains thereof wherein the first alternating current input signal V1 is applied to the gates and the sources are grounded as well as a second NMOS transistor NM2 and a fourth transistor NM4 generating the second current I2 and the third current I3 through the drains thereof wherein the second alternating current input signal V2 is applied to the gates and the sources are grounded.

The first current subtractor 130 consists of a first and a second PMOS transistor PM1 and PM2, a third PMOS transistor PM3, and a fourth PMOS transistor PM4.

In the first and second PMOS transistors PM1 and PM2, an external voltage VDD is applied to the sources and the gates are shared thereof.

In the third PMOS transistor PM3, a source is connected to the drain of the first PMOS transistor PM1 and a bias voltage BIAS is applied to a gate, and a drain is connected to the drain of the first NMOS transistor NM1 of the input part and the gates of the first and second PMOS transistors PM1 and PM2.

In the fourth PMOS transistor PM4, a source is connected to the drain of the second PMOS transistor PM2 and the drain of the second NMOS transistor NM2 in the input part and a bias voltage BIAS is applied to a gate thereof.

Accordingly, the fifth current I5 is outputted through the drain the fourth PMOS transistor PM4 by subtracting the second current I2 flowing through the drain of the second PMOS transistor PM2 from the first current I1 flowing through the drain of the third PMOS transistor PM3.

The second current subtractor 150 consists of a fifth and a sixth PMOS transistor PM5 and PM6, a seventh PMOS transistor PM7, and an eighth PMOS transistor PM8.

In the fifth and sixth PMOS transistors PM5 and PM6, an external voltage VDD is applied to the sources and the gates are shared thereof.

In the seventh PMOS transistor PM7, a source is connected to the drain of the fifth PMOS transistor PM5 and a bias voltage BIAS is applied to a gate, and a drain is connected to the drain of the fourth NMOS transistor NM4 in the input part and the gates of the fifth and sixth PMOS transistors PM5 and PM6.

In the eighth PMOS transistor PM8, a source is connected to the drain of the sixth PMOS transistor PM6 and the drain of the third NMOS transistor NM3 in the input part and a bias voltage BIAS is applied to a gate thereof.

Accordingly, the sixth current I6 is outputted through the drain the eighth PMOS transistor PM8 by subtracting the fourth current I4 flowing through the drain of the sixth PMOS transistor PM6 from the third current I3 flowing through the drain of the seventh PMOS transistor PM7.

The output part 170 consists of a resistor RL through which a wave-rectified output voltage Vout is generated by adding the fifth current I5 outputted to the drain of the fourth PMOS transistor PM4 in the first current subtractor 130 to the sixth current I6 outputted to the drain of the seventh PMOS transistor PM7. The resistor as a passive device may be replaced by an active device having a resistance component by manipulating its bias voltage.

Figure 3A:
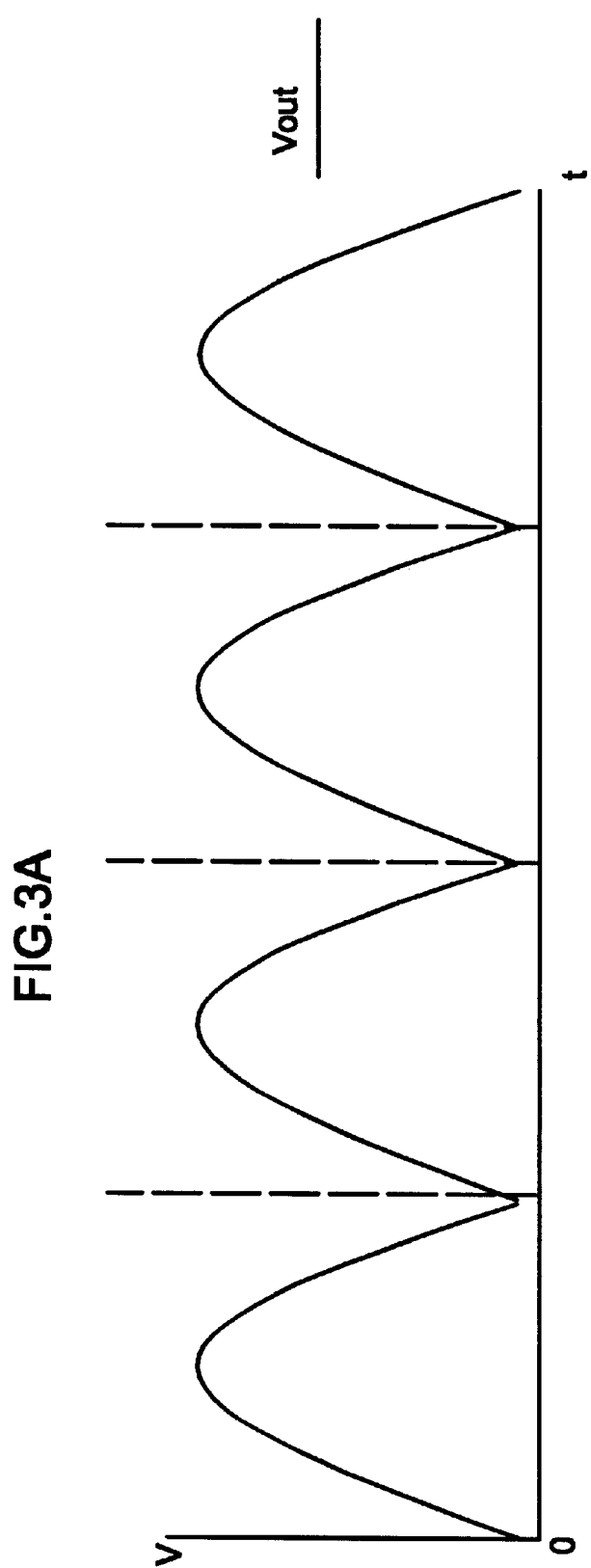
FIG. 3 shows operational waveforms of a precision fullwave rectifier using MOSFETs according to the present invention.
Figure 3B:
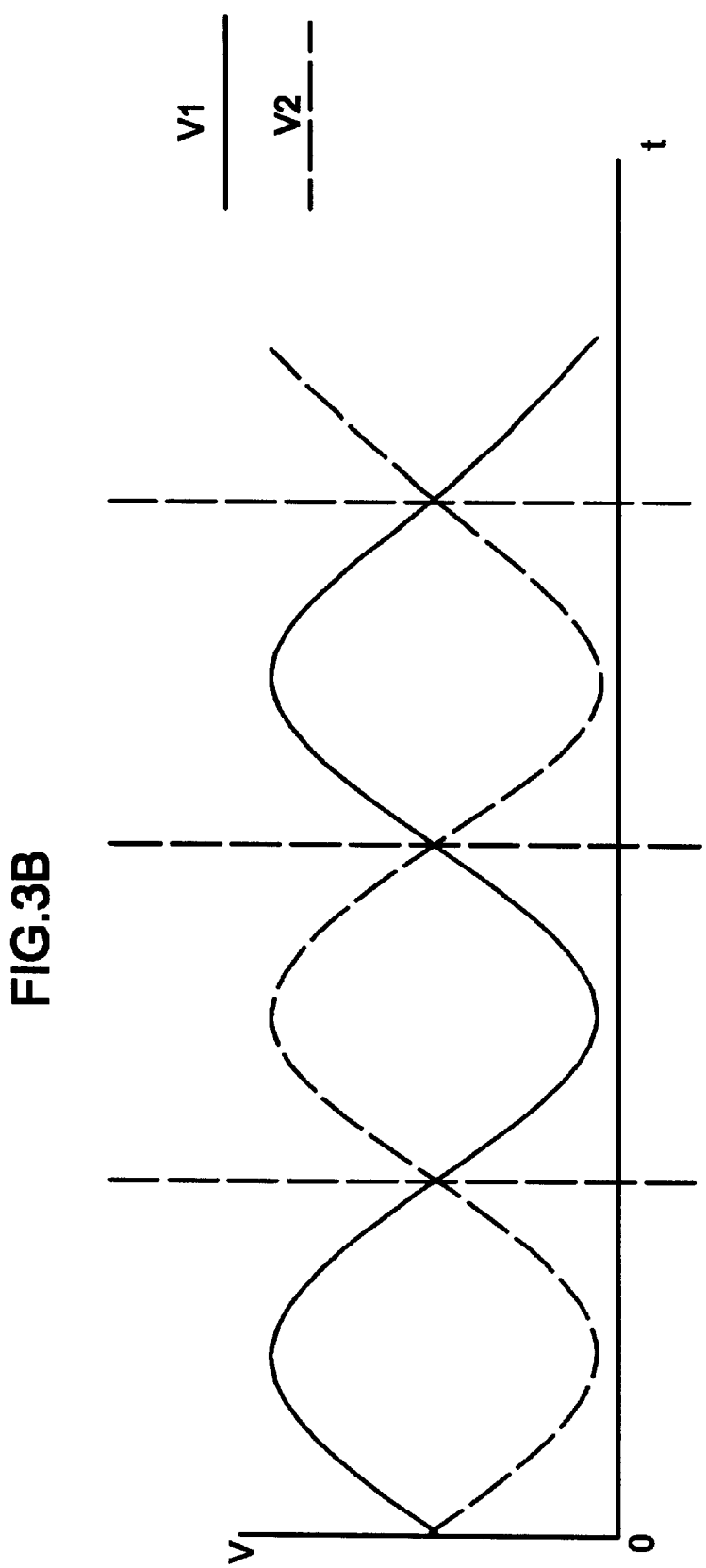

FIG. 3 shows operational waveforms of a precision fullwave rectifier using MOSFETs according to the present invention.

A precision fullwave rectifier 100 of the present invention is operated by the following manner. The input part 110 receives the first and second alternating current signals V1 and V2 between which a phase difference of 180° exists, wherein $$V1 = V_{dc} + V_{id}/2 \qquad \text{(formula 2-1)}$$

$$V2 = V_{dc} - V_{id}/2 \qquad \text{(formula 2-2).}$$

Namely, the minimum level of the first and second alternating current signals V1 and V2 is equal to or higher than the ground level VSS, and the maximum level is equal to or under the applied voltage VDD. The first and second alternating current signals V1 and V2 always enable to turn 'on' the first, second, fifth, and sixth transistors NM1, NM2, NM3, and NM4 in the input part 110.

When the first alternating current input signal V1 is inputted as a positive pulse(i.e., a positive half portion of the alternating current component Vid) and the second alternating current input signal V2 is inputted as a negative pulse (i.e., a negative half portion of the alternating current component) wherein [V1−V2>0], the first current I1 and the fourth current I4 are proportional to the first alternating current input signal V1 while the second current I2 and the third current I3 are proportional to the second alternating current input signal V2.

Therefore, the current flowing through the drains of the-third and fourth PMOS transistors PM3 and PM4 in the first current subtractor 130 is represented by the following formula.

$$I5 = I1 - I2 \quad \text{(formula 2-3)}$$
$$= k(V1 - Vt)^2 - k(V2 - Vt)^2$$
$$= k(V1 + V2 - 2Vt) \cdot (V1 - V2)$$
$$= 2k(Vdc - Vt) \cdot (V1 - V2), \text{ wherein}$$

$Vt$ = threshold voltage of a MOS transistor and $k$ = constant

Moreover, as the fourth current I4 of the second current subtractor 150 is larger than the third current I3, current fails to flow through the drain of the eighth PMOS transistor PM8.

$$I6=0 \quad \text{(formula 2-4)}$$

Therefore, the eighth PMOS transistor PM8 works as if turned off.

Thus, the wave-rectified output voltage Vout outputted through both ends of the resistor RL in the output part 170 is shown in the following formula.

$$Vout = IL \cdot RL \quad \text{(formula 2-5)}$$
$$= 2k \cdot RL \cdot (Vdc - Vt) \cdot (V1 - V2)$$

When the first alternating current input signal V1 is inputted as a negative pulse and the second alternating current input signal V2 is inputted as a positive-pulse[i.e., (V1–V2)<0], current fails to flow through the drain of the fourth PMOS transistor PM4 since the second current I2 is larger than the first current I1 in the first current subtractor 130.

Therefore, the fourth PMOS transistor PM4 works as if turned off.

Besides, the current amount flowing through the drain of the fifth PMOS transistor PM5 is as good as the current flowing through the drain of the sixth PMOS transistor PM6.

Thus, the amount of the current flowing through the drains of the seventh and eighth PMOS transistors PM4 and PM8 is shown in the following formula.

$$I6 = I3 - I4 \quad \text{(formula 2-7)}$$
$$= k(V2 - Vt)^2 - k(V1 - Vt)^2$$
$$= k(V2 + V1 - 2Vt) \cdot (V2 - V1)$$
$$= 2k(Vdc - Vt) \cdot (V2 - V1), \text{ wherein}$$

$Vt$ = threshold voltage of a MOS transistor and $k$ = constant voltage of a MOS transistor and k=constant (formula 2-7)

Thus, the wave-rectified output voltage Vout outputted through both ends of the resistor RL in the output part 170 is shown in the following formula.

$$Vout = IL \cdot RL \quad \text{(formula 2-8)}$$
$$= 2k \cdot RL \cdot (Vdc - Vt) \cdot (V2 - V1)$$

Comparing the formula 2-5 to the formula 2-8, the wave-rectified current output voltage Vout outputted through both ends of the resistor RL in the output part 170 is shown in the following formula.

$$Vout = 2k \cdot RL \cdot (Vdc - Vt) \cdot |V1 - V21| \quad \text{(formula 2-9)}$$

The precision fullwave rectifier using MOSFETs according to the present invention has an output characteristic of wave-rectification.

The precision fullwave rectifier of the present invention consisting of a resistor and MOS transistors enables to be realized as an integrated circuit, thereby preventing the problems of the related art using operational amplifiers.

Namely, the present invention, using MOSFETs and a resistor instead of individual devices such as diodes and operational amplifiers, lessens a layout area of a circuit owing to simple fabrication, reduces power consumption, and eliminating the limitation of operating speed due to operational amplifiers.

It will be apparent to those skilled in the art that various modifications and variations can be made in a precision fullwave rectifier of the present invention without departing from the spirit or scope of the inventions. Thus, it is intended that the present invention cover the modifications and variations of this invention provided they come within the scope of the appended claims and equivalents.

What is claimed is:

1. A precision fullwave rectifier, the precision fullwave rectifier used in communication systems and non-linear signal processors, the precision fullwave rectifier comprising:

an input part receiving a first alternating current input signal and a second alternating current input between which a phase difference of about 180° exists, the input part generating a first current and a fourth current proportional to the first alternating current input signal, the input part generating a second current and a third current proportional to the second alternating current input signal;

a first current subtractor outputting a fifth current by subtracting the second current from the first current;

a second current subtractor outputting a sixth current by subtracting the fourth current from the third current; and an output part transforming and generate an wave-rectified output voltage by adding the fifth current to the sixth current.

2. The precision fullwave rectifier according to claim 1, the input part further comprising:

a first NMOS transistor and a third NMOS transistor generating the first current and the fourth current through drains thereof, respectively, wherein the first alternating current input signal is applied to gates thereof and sources thereof are grounded; and a second NMOS transistor and a fourth NMOS transistor generating the second current and the third current through drains thereof, respectively, wherein the second alternating current input signal is applied to gates thereof and sources thereof are grounded.

3. The precision fullwave rectifier according to claim 1, the first current subtractor further comprising:

a first PMOS transistor and a second PMOS transistor wherein an external voltage is applied to sources thereof and gates thereof are in common;

a third PMOS transistor of which source is connected to the drain of the first PMOS transistor and of which drain is connected to an output terminal of the first current in the input part and the gates of the first and second PMOS transistors wherein a bias voltage is applied to a gate of the third PMOS transistor; and a fourth PMOS transistor of which source is connected to the drain of the second PMOS transistor and of which drain is connected to the drain of the second PMOS transistor and the drain of the second NMOS transistor in the input part wherein a bias voltage is applied to a gate of the fourth PMOS transistor, and wherein a fifth current attained by subtracting the second current from the first current flowing through the drain of the third PMOS transistor is outputted from a drain of the fourth PMOS transistor.

4. The precision fullwave rectifier according to claim 1, the second current subtractor further comprising:

a fifth PMOS transistor and a sixth PMOS transistor wherein an external voltage is applied to sources thereof and gates thereof are in common;

a seventh PMOS transistor of which source is connected to the drain of the fifth PMOS transistor and of which drain is connected to an output terminal of the fourth current in the input part and the gates of the fifth and sixth PMOS transistors wherein a bias voltage is applied to a gate of the seventh PMOS transistor; and an eighth PMOS transistor of which source is connected to the drain of the sixth PMOS transistor and to an output terminal of the third current in the input part wherein a bias voltage is applied to a gate of the eighth PMOS transistor, and wherein a sixth current attained by subtracting the fourth current from the third current flowing through the drain of the seventh PMOS transistor is outputted from a drain of the eighth PMOS transistor.

5. The precision fullwave rectifier according to claim 1, wherein the output part consists of a resistor.

6. The precision fullwave rectifier according to claim 1, the first current subtractor further comprising:

a first PMOS transistor and a second PMOS transistor wherein an external voltage is applied to sources thereof and gates thereof are in common;

a third PMOS transistor of which source is connected to the drain of the first PMOS transistor and of which drain is connected to an output terminal of the first current in the input part and the gates of the first and second PMOS transistors wherein a bias voltage is applied to a gate of the third PMOS transistor; and a fourth PMOS transistor of which source is connected to the drain of the second PMOS transistor and the drain of the second NMOS transistor in the input part wherein a bias voltage is applied to a gate of the fourth PMOS transistor, and wherein a fifth current attained by subtracting the second current flowing through the drain of the second NMOS transistor from the first current flowing through the drain of the third PMOS transistor is outputted from a drain of the fourth PMOS transistor.

7. The precision fullwave rectifier according to claim 1, the second current subtractor further comprising:

a fifth PMOS transistor and a sixth PMOS transistor wherein an external voltage is applied to sources thereof and gates thereof are in common;

a seventh PMOS transistor of which source is connected to the drain of the fifth PMOS transistor and of which drain is connected to the drain of the fourth NMOS transistor in the input part and to the gates of the fifth and sixth PMOS transistors wherein a bias voltage is applied to a gate of the seventh PMOS transistor; and an eighth PMOS transistor of which source is connected to the drain of the sixth PMOS transistor and to the drain of the third NMOS transistor in the input part wherein a bias voltage is applied to a gate of the eighth PMOS transistor, and wherein a sixth current attained by subtracting the fourth current flowing through the drain of the third NMOS transistor from the third current flowing through the drain of the seventh PMOS transistor is outputted from a drain of the eighth PMOS transistor.

8. The precision fullwave rectifier according to claim 6, wherein the output part further comprising a resistor connected between the drain of the fourth PMOS transistor in the first current subtractor and the drain of the seventh PMOS transistor in the second current subtractor wherein an wave-rectified output voltage is outputted by adding the fifth current to the sixth current through transformation.

9. The precision fullwave rectifier according to claim 7, wherein the output part further comprising a resistor connected between the drain of the fourth PMOS transistor in the first current subtractor and the drain of the seventh PMOS transistor in the second current subtractor wherein an wave-rectified output voltage is outputted by adding the fifth current to the sixth current through transformation.

* * * * *